(12) United States Patent
Cheng et al.

(10) Patent No.: US 7,474,368 B2
(45) Date of Patent: Jan. 6, 2009

(54) DISPLAY PANEL

(75) Inventors: Ching-Sheng Cheng, Hsin-Chu (TW); Chih-Jen Hu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 213 days.

(21) Appl. No.: 11/671,472

(22) Filed: Feb. 6, 2007

(65) Prior Publication Data

US 2008/0117366 A1 May 22, 2008

(30) Foreign Application Priority Data

Nov. 22, 2006 (TW) .............................. 95143178 A

(51) Int. Cl.
*G02F 1/1335* (2006.01)
(52) U.S. Cl. ....................... 349/114; 349/106; 349/107; 349/108
(58) Field of Classification Search ......... 349/106–108, 349/114
See application file for complete search history.

(56) References Cited

U.S. PATENT DOCUMENTS 6,909,479 B2    6/2005  Iijima
2004/0257500 A1*  12/2004  Kim et al. ................... 349/106

FOREIGN PATENT DOCUMENTS

TW      I245132       12/2005
TW      200617438     6/2006

* cited by examiner

*Primary Examiner*—David Nelms
*Assistant Examiner*—Phu Vu
(74) *Attorney, Agent, or Firm*—Winston Hsu

(57) ABSTRACT

A display panel is disclosed. The display panel includes a first substrate, a second substrate, and a pixel and a color filter disposed between the first substrate and the second substrate. The pixel including a plurality of subpixels has a transmitting region and a reflecting region. The color filter includes a plurality of colors corresponding to the subpixels respectively. The adjacent colors of the color filter overlap with each other and the width of the overlapped portion of the transmitting region is greater than that of the reflecting region.

11 Claims, 4 Drawing Sheets

DISPLAY PANEL

BACKGROUND OF THE INVENTION

1. Field of the Invention

The invention relates to a display panel, and more particularly, to a transflective liquid crystal display panel.

2. Description of the Prior Art

According to the source of illuminating light, liquid crystal displays can be divided into three categories, such as transmissive, reflective, and transflective modes. The transmissive liquid crystal display has a backlight for producing light. The light produced by the backlight will pass through the liquid crystal panel to allow users to see the image displayed on the display panel. The reflective liquid crystal display has a reflective electrode. When displaying an image, the ambient light of the reflective liquid crystal display will enter the liquid crystal display from the observer side of the user and then be reflected by the reflective electrode. The reflected light will pass through the liquid crystal panel again and the resulting image will be shown on the display panel. The transflective liquid crystal display has both transmissive mode and reflective mode. In other words, each pixel area of the transflective liquid crystal display includes a transmitting region and a reflecting region, in which the transmitting region of the display uses backlight as a light source and the reflecting region of the display uses ambient light as a light source.

Please refer to FIG. 1. FIG. 1 illustrates a perspective view of a transflective liquid crystal display according to the prior art. As shown in FIG. 1, the conventional transflective liquid crystal display 36 includes a display panel 10 and a backlight module 34. The display panel 10 includes a top substrate 12, a bottom substrate 14, and a liquid crystal layer 16 disposed between the top substrate 12 and the bottom substrate 14. Additionally, the display panel 10 includes a plurality of pixels 18 disposed between the top substrate 12 and the bottom substrate 14, in which each of the pixels 18 includes a transmitting region 20 and a reflecting region 22. Preferably, the transmitting region 20 includes a transparent pixel electrode 24 formed on the bottom substrate 14 and the reflecting region 22 includes a reflecting electrode 26 disposed on the bottom substrate 14 surrounding the transparent pixel electrode 24.

The display panel 10 also includes a color filter 28 formed on the surface of the top substrate 12 and a transparent conductive layer 30 disposed on the color filter 28. The color filter 28 includes regions of different colors, such as red, green, and blue regions. Alternatively, the color filter 28 can be formed on the bottom substrate 14 to form a color filter on array (COA) substrate. The operation of the transflective liquid crystal display 36 involves a transmissive mode and a reflective mode. Under the operation of the transmissive mode, light generated by the backlight module 34 would pass from the bottom substrate 14, the transparent pixel electrode 24, the liquid crystal layer 16, the color filter 28, and exit via the top substrate 12. Under the operation of the reflective mode, ambient light would pass from the top substrate 12 and the color filter 28 to the reflecting electrode 26. After being reflected by the reflecting electrode 26, light would pass through the color filter 28 again and exit via the top substrate 12.

The pixel 18 of the display panel 10 is disposed between the top substrate 12 and the bottom substrate 14, and the color filter 28 is disposed on the surface of the top substrate 12. With reference to FIG. 2, FIG. 2 illustrates a pixel of the transflective liquid crystal display panel according to the prior art. As shown in FIG. 2, the pixel 18 of the display panel 10 includes a plurality of subpixels 31, 32, and 33 disposed between the top substrate 12 and the bottom substrate 14, in which each of the subpixels is disposed with respect to a color of the color filter 28. For instance, the subpixel 31 is disposed corresponding to the red region of the color filter 28, the subpixel 32 is disposed corresponding to the green region of the color filter 28, and the subpixel 33 is disposed corresponding to the blue region of the color filter 28.

It should be noted that in the conventional liquid crystal display, the region between subpixels with respect to either the transmitting region or the reflecting region does not include any transparent conductive electrode thereon. As a result, the liquid crystals in this region are aligned unevenly during a dark state, which ultimately causes light leakage and contrast degradation. In order to prevent this problem, the fabrication of recent transflective liquid crystal displays utilizes black matrices 35 to block these regions that are prone to light leakage. However, in the present design of utilizing black matrices, the width of the overlapped portion of the black matrices 35 of the transmitting region 20 is equal to that of the reflecting region 22. This design facilitates the blocking of light leaked from the transmitting region but also degrades the aperture ratio of the reflecting region.

SUMMARY OF THE INVENTION

It is an objective of the present invention to provide a display panel for solving the aforementioned problem.

A display panel is disclosed. The display panel includes a first substrate, a second substrate, and a pixel and a color filter disposed between the first substrate and the second substrate. The pixel including a plurality of subpixels has a transmitting region and a reflecting region. The color filter includes a plurality of colors corresponding to the subpixels respectively. The adjacent colors of the color filter overlap with each other and the width of the overlapped portion of the transmitting region is greater than the width of the overlapped portion of the reflecting region.

Preferably, the overlapped portion of the adjacent colors of the color filter is disposed with respect to the location of the data line according to the present invention. The width of the overlapped portion of the transmitting region is greater than that of the reflecting region. By overlapping the adjacent colors of the color filter with the data lines, the present invention is able to block leakage of light with respect to the transmitting region of the display panel. Since the width of the overlapped region of the transmitting region is greater than that of the reflecting region, the present invention also maintains the aperture area of the reflecting region and thereby increasing the contrast of the display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
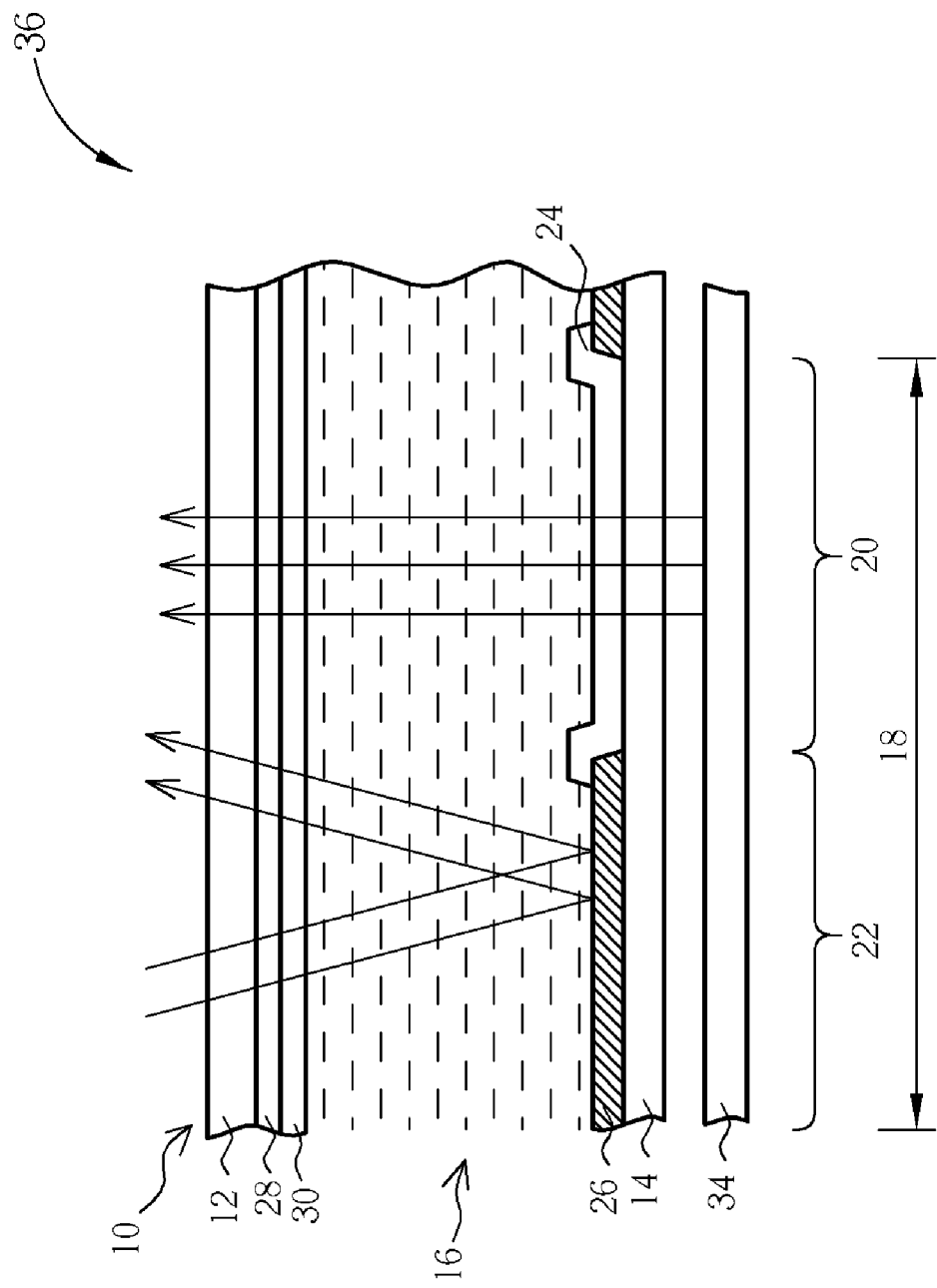
FIG. 1 illustrates a perspective view of a transflective liquid crystal display according to the prior art.
Figure 2:
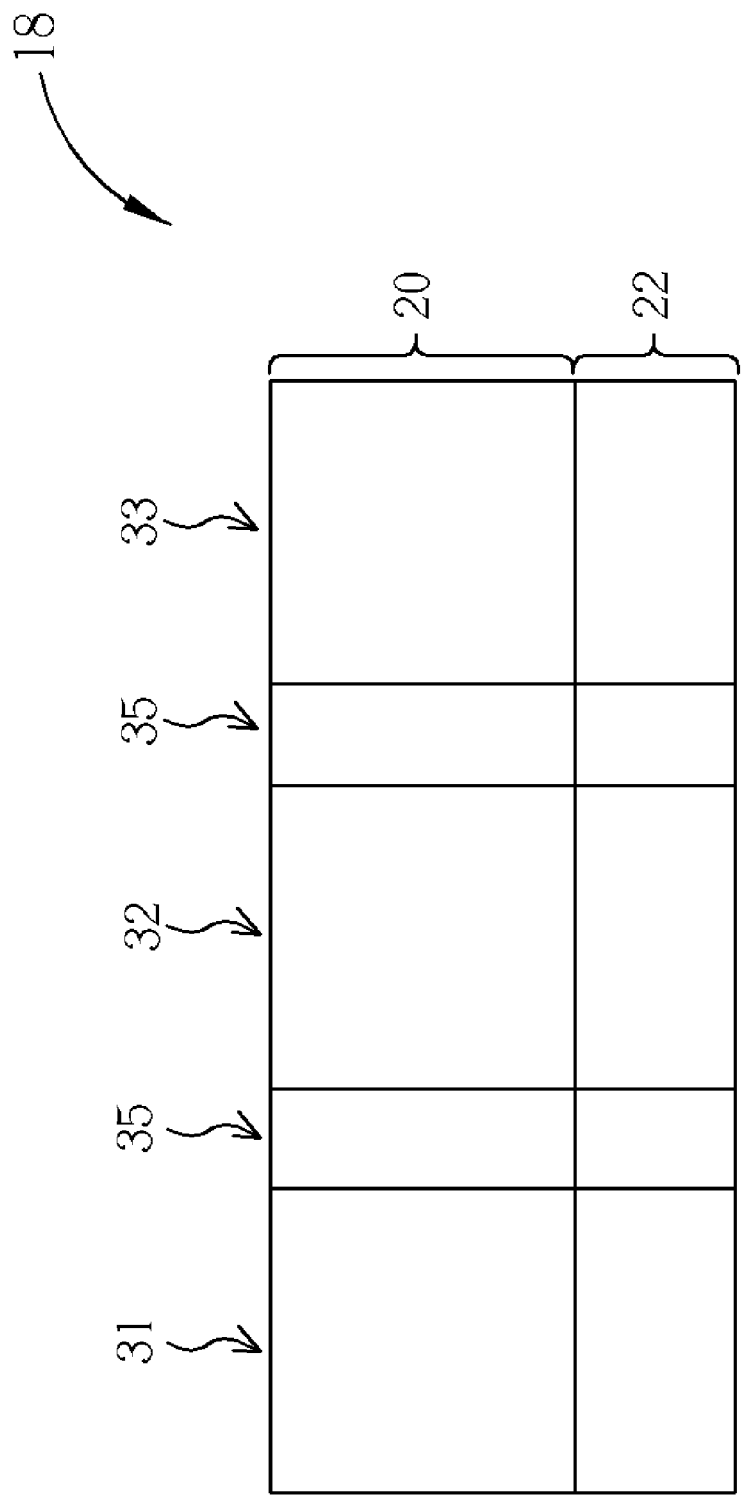
FIG. 2 illustrates a pixel of the transflective liquid crystal display panel according to the prior art.
Figure 3:
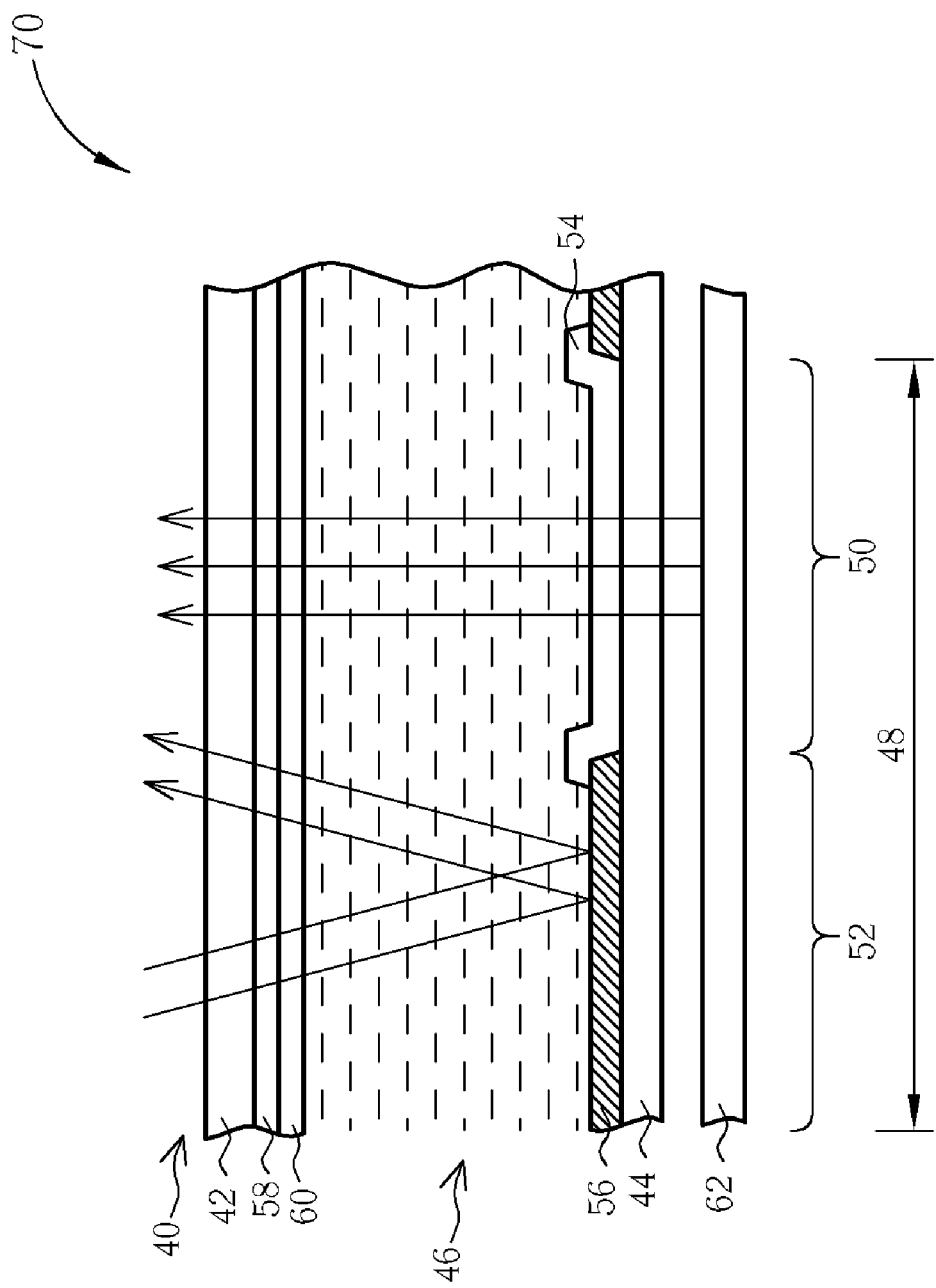
FIG. 3 illustrates a perspective view of a transflective liquid crystal display according to an embodiment of the present invention.

Please refer to FIG. 3. FIG. 3 illustrates a perspective view of a transflective liquid crystal display according to an embodiment of the present invention. As shown in FIG. 3, the transflective liquid crystal display 70 of the present invention includes a display panel 40 and a backlight module 62. The display panel 40 includes a top substrate 42, a bottom substrate 44, and a liquid crystal layer 46 disposed between the top substrate 42 and the bottom substrate 44. The display panel 40 also includes a plurality of pixels 48 disposed between the top substrate 42 and the bottom substrate 44, wherein each of the pixels 48 includes a transmitting region 50 and a reflecting region 52. Preferably, the transmitting region 50 includes a transparent pixel electrode 54 disposed on the bottom substrate 44 and the reflecting region 52 includes a reflecting electrode 56 disposed on the bottom substrate 44 adjacent to the transparent pixel electrode 54.

The display panel 40 also includes a color filter 58 formed on the surface of the top substrate 52, a transparent conductive layer 60 disposed on the color filter 58, and a plurality of wires (not shown) disposed on the bottom substrate 44. The color filter 58 includes regions of different colors, such as red, green, and blue regions, and the plurality of wires can be scan lines or data lines. According to an embodiment of the present invention, the color filter 58 can be disposed on the bottom substrate 44 to form a color filter on array substrate, which is also within the scope of the present invention. As mentioned previously, the operation of the transflective liquid crystal display 70 involves a transmissive mode and a reflective mode. Under the operation of the transmissive mode, light generated by the backlight module 62 would pass from the bottom substrate 44, the transparent pixel electrode 54, the liquid crystal layer 46, the color filter 58, and exit through the top substrate 42. Under the operation of the reflective mode, ambient light would pass from the top substrate 42 and the color filter 58 to the reflecting electrode 56. After being reflected by the reflecting electrode 56, light would pass through the color filter 58 again and exit via the top substrate 42.

Figure 4:
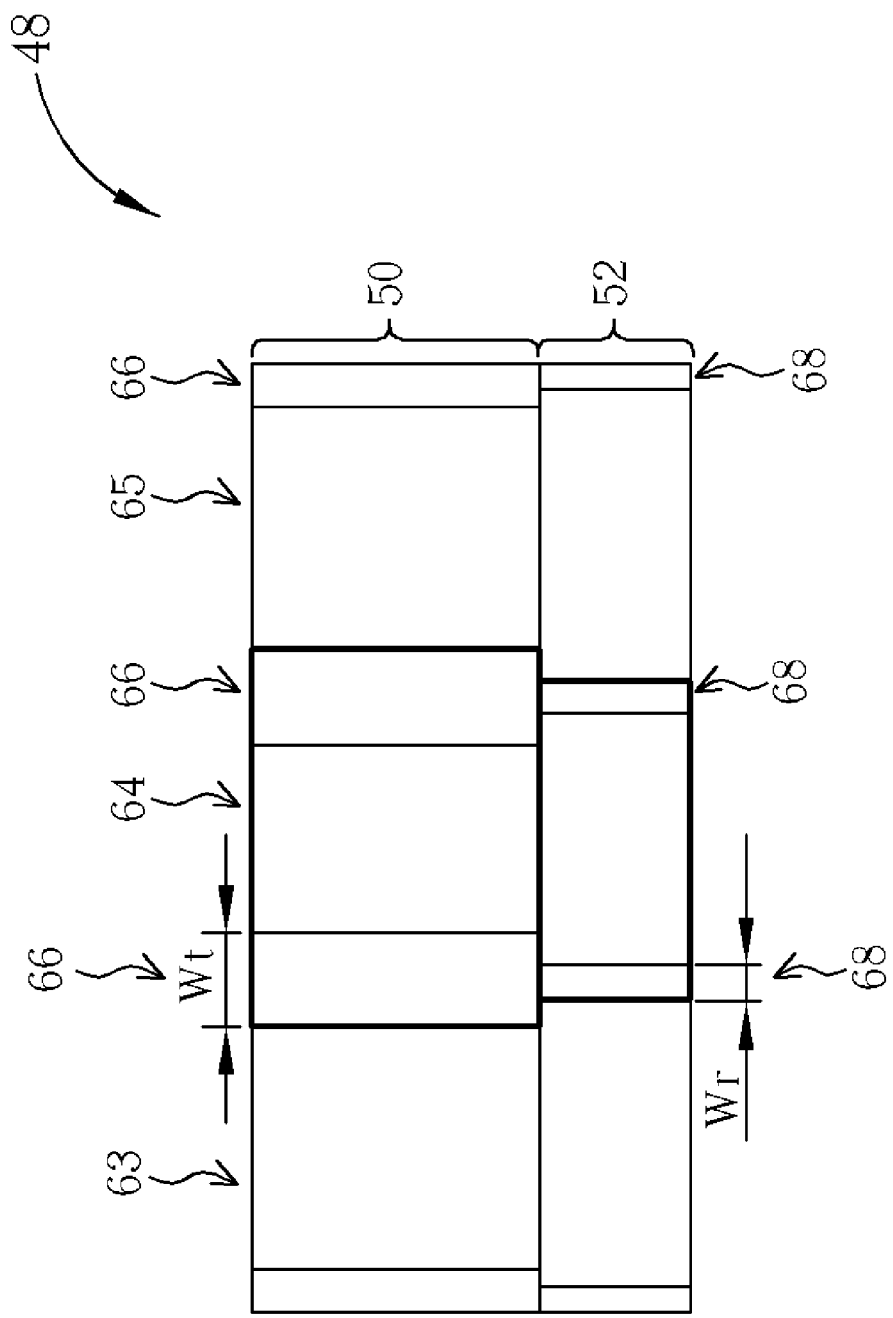
FIG. 4 illustrates a pixel of the transflective liquid crystal display panel according to an embodiment of the present invention.

Please refer to FIG. 4. FIG. 4 illustrates a pixel of the transflective liquid crystal display panel according to an embodiment of the present invention. According to the aforementioned embodiment, the pixel 48 of the display panel 40 is disposed between the top substrate 42 and the bottom substrate 44, and the color filter 58 is disposed on the surface of the top substrate 42. As shown in FIG. 4, the pixel 48 of the display panel 40 includes a plurality of subpixels 63, 64, 65 disposed between the top substrate 42 and the bottom substrate 44, wherein each of the subpixels is disposed with respect to a color of the color filter 58. For instance, the subpixel 63 is disposed corresponding to the red region of the color filter 58, the subpixel 64 is disposed corresponding to the green region of the color filter 58, and the subpixel 65 is disposed corresponding to the blue region of the color filter 58.

Referring to FIG. 4, the adjacent colors of the color filter 58 overlap with each other in both the transmitting region 50 and the reflecting region 52, in which the overlapped portion 66 of the transmitting region 50 includes a width Wt and the overlapped portion 68 of the reflecting region 52 includes a width Wr. According to the preferred embodiment of the present invention, the overlapped portion 66 and 68 of the color filter 58 in either the transmitting region 50 or the reflecting region 52 is approximately 3 μm to 15 μm. However, it should be noted that the width Wt of the overlapped portion of the transmitting region 50 is greater than the width Wr of the overlapped portion of the reflecting region 52. Additionally, the overlapped portion of the color filter 58 also overlaps the data lines of the bottom substrate 44 vertically, and the width of the overlapped portion of the transmitting region 50 can be equal to, greater than, or less than the width of the data lines. For instance, while the overlapped portion of the transmitting region 50 and the overlapped portion of the reflecting region 52 overlap the data lines simultaneously, the width Wt of the overlapped portion of the transmitting region 50 can be equal to the width of the data line and the width Wr of the overlapped portion of the reflecting region 52 can be 0.

Overall, in contrast to the arrangement of the conventional color filter and corresponding pixels, the adjacent colors of the color filter of the present invention are overlapped with each other, in which the width of the overlapped portion of the transmitting region is greater than that of the reflecting region. In other words, by overlapping the adjacent colors of the color filter with the data lines, the present invention is able to block leakage of light with respect to the transmitting region. Since the width of the overlapped region of the transmitting region is greater than that of the reflecting region, the present invention also maintains the aperture area of the transmitting region and increases the contrast of the display panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel, comprising:
   a first substrate and a second substrate;
   a pixel having a plurality of subpixels, disposed between the first substrate and the second substrate, wherein the pixel comprises a transmitting region and a reflecting region; and
   a color filter disposed between the first substrate and the second substrate, wherein the color filter comprises a plurality of colors corresponding to the subpixels respectively, the adjacent colors of the color filter overlap with each other, and the width of the overlapped portion of the transmitting region is greater than the width of the overlapped portion of the reflecting region.

2. The display panel of claim 1, wherein the color filter comprises red color, green color, and blue color.

3. The display panel of claim 1, wherein the width of the overlapped portion of the transmitting region is between 3 μm to 15 μm.

4. The display panel of claim 1, further comprising a plurality of data lines disposed between the subpixels.

5. The display panel of claim 4, wherein the adjacent colors of the color filter overlap with each other on the data lines.

6. The display panel of claim 4, wherein the width of each overlapped portion of the transmitting region is substantially equal to the width of each data line.

7. The display panel of claim 4, wherein the width of each overlapped portion of the transmitting region is less than the width of each data line.

8. The display panel of claim 1, wherein the width of the overlapped portion of the reflecting region is equal to zero.

9. The display panel of claim 1, wherein the color filter is disposed on the first substrate.

10. The display panel of claim 1, further comprising a transparent conductive layer disposed on the first substrate and the color filter.

11. The display panel of claim 1, wherein the color filter is disposed on the second substrate.

* * * * *